June 3, 1969 T. A. HOSKINS ET AL 3,447,743
RECORD ENTRY POSITIONER
Filed Oct. 14, 1965
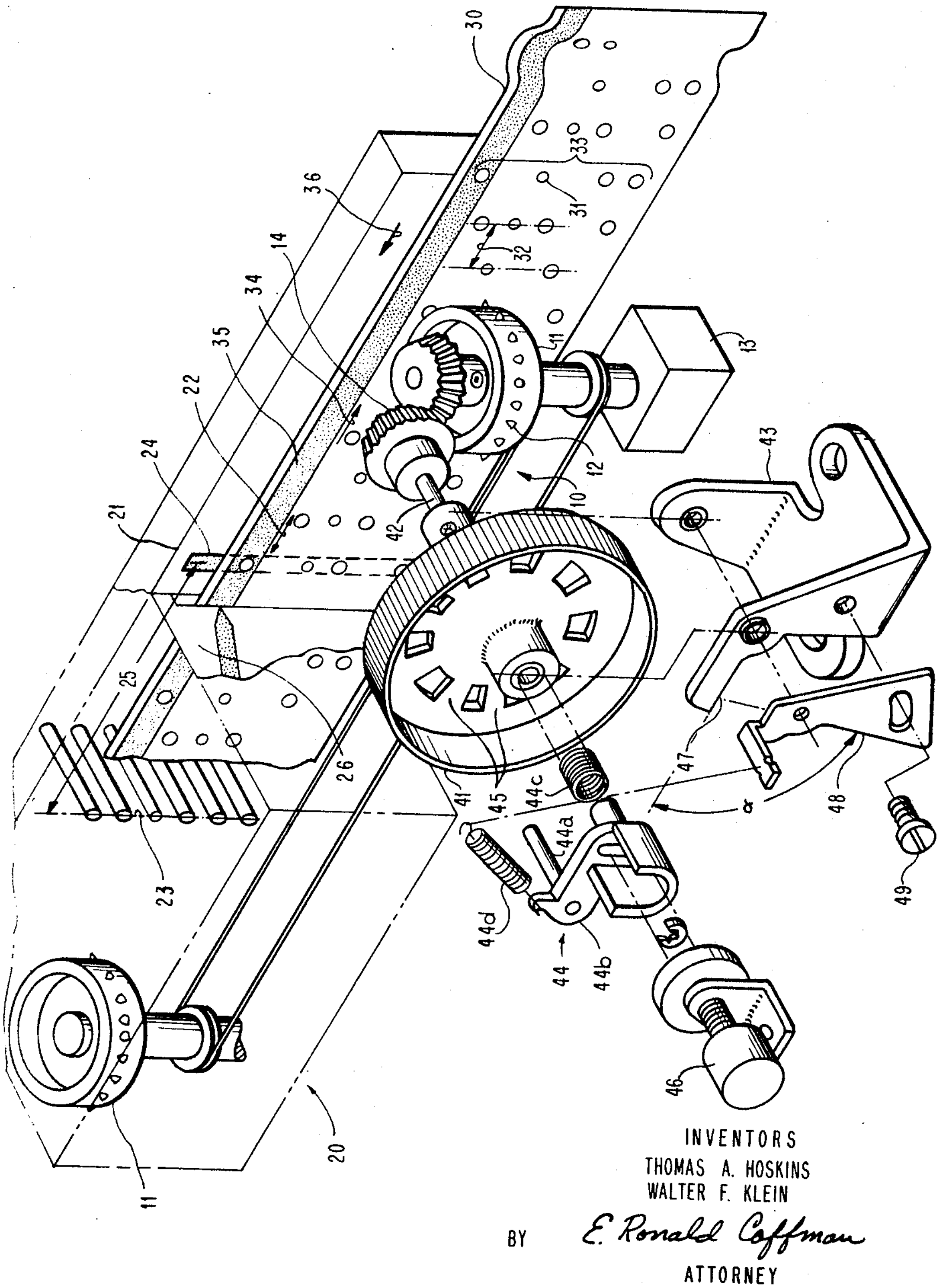
INVENTORS
THOMAS A. HOSKINS
WALTER F. KLEIN
BY E. Ronald Coffman
ATTORNEY 3,447,743

RECORD ENTRY POSITIONER

Thomas A. Hoskins and Walter F. Klein, Lexington, Ky., assignors to International Business Machines Corporation, Armonk, N.Y., a corporation of New York Filed Oct. 14, 1965, Ser. No. 495,775
Int. Cl. G06k *1/08, 1/10;* B26f *1/04*
U.S. Cl. 234—129 6 Claims The record entry positioner herein disclosed enables a specific entry of a record to be positioned accurately at an operating station, such as a punch, where the station itself is hidden from view by associated mechanism.

In paper tape readers and punches, and similar record utilizing mechanisms, it is often desirable to locate a specific data entry at the operating station. For example, it may be desired to begin a reading operation at the beginning of a line, a paragraph, or a word, thus requiring that the record be located relative to the reader at the beginning of such a sequence. In a code punch it is often desired to relocate specific data entries in a tape back at the punching station for purposes of correction. Tape containing erroneous entries is ordinarily corrected by overpunching all holes which is called a delete code. It is customary to delete data either a line at a time or a word at a time, depending upon when an error is caught. Accordingly, it is usual to locate either a carriage return code or a word space code at or just after the punching station, and then punch through the entire erroneous line or word. The construction of some readers and punches permit direct location of any desired code at the operating station. However, for the most part such operating stations are invisible, or at least partially obscured by the associated mechanism, thus making it difficult to locate a reference code for beginning an operating sequence.

It has thus been an object of our invention to provide a semi-automatic record entry positioning mechanism that permits accurate location of a selected data entry without interferring, or in any way restricting, the particular operating mechanism itself.

Another object of our invention has been to provide a record entry positioning mechanism that is manually operable by the use of one hand to provide for rapid accurate operation.

This invention is based principally on our concept of providing a clearly visible reference mark that is separated from the operating mechanism to thereby permit selection of a desired record entry without restricting the construction of the operating mechanism itself. We have provided a simple distance measuring device that mechanically relates the distance between the external reference mark and the operating mechanism to a manual drive wheel by establishing limits of angular movement of the drive wheel. A pushbutton device is provided for selectively making the limits operative.

These and other concepts, features, and advantages of our invention will be more apparent to those skilled in the art upon reading and understanding the following more particular description of a preferred embodiment of our invention where specific reference is made to the accompanying drawings of which:

The figure is a perspective exploded view of a paper tape punch having a record entry positioner constructed in accordance with our invention.

More specifically, in the figure there is shown tape feed apparatus 10 for a paper tape punch or other operating mechanism 20. For example, the operating mechanism could be a tape reader or even a printer. The tape feed apparatus 10 includes a support table 21 that defines a path 22 for a record strip, tape, or other record media 30. The tape 30 is driven along path 22 by tape feed pinwheels 11 which have cogs or teeth 12 that engage feed holes 31 therein to insure a positive positional correlation therebetween. The feed holes 31 are spaced longitudinally along the tape by a feed increment 32 that also represents the spacing between adjacent data entries 33. The tape 30 is normally driven past an operating station 23 of mechanism 20 in the direction of arrow 34 in data entry space increments during punching operation by a main tape feed mechanism 13. The mechanism 13 can be of any known construction; for example, like that disclosed in U.S. Patent 2,619,532 to E. O. Blodgett, entitled "Tape Reader" issued Nov. 25, 1952.

The tape 30 is also movable in either direction along its path 22 by a manually operable drive wheel 41 that is geared through a transmission 14 to the pinwheels 11 for rotation therewith. The feed mechanism 13 includes conventional detent means for assuring accurate incremental positioning of the pinwheels 11. The drive wheel 41 is rotatably mounted on a shaft 42 supported by a bracket 43 connected to the apparatus frame.

The object of the positioning mechanism is to locate any desired data entry 33 at the punching station 23 since, due to surrounding mechanism 20, the punching station 23 is not visible. A clearly visible reference mark or visual indicator 24 is positioned along the path 22 a distance 25 that is a predetermined multiple of data entry feed increments 32. Accordingly, it is possible to locate the desired character in precise alignment with the clearly visible reference mark 24 and thereby determine that the data entry is a predetermined number of feed incredments 32 from the punching station 23.

It is not necessary, however, to mentally count the spacing increments to achieve final positioning of the tape as we have provided a mechanical motion limiter for performing this function. The motion limiter employs a selectively, activatably, rotatable positioner 44 including a pin **44*a* that is mounted on a rotatable crank arm 44*b* supported by the shaft 42 and axially slidably thereon against compression spring 44*c*. The pin 44*a* is engageable with any of an angular plurality of teeth 45 that are positioned at data entry spaced increments about the manually operable drive wheel 41. A pushbutton 46 is connected to move axially along the shaft 42 with crank arm 44*b* to thereby permit manual sliding of pin 44*a* into engagement with the teeth 45, thus causing the crank arm 44*b* to rotate in unison with the wheel 41. The travel of the crank arm 44*b* is limited by a fixed stop 47 and by an adjustable stop 48 which during operation is held fixed by a screw 49 to define an angular increment $\alpha$ therebetween that is accurately proportional to the distance 25. The factor of porportionality may be selected to place the selected code at the previous station 23 or just before or just after it, as required. A resilient homing spring 44*d* normally retains the crank arm 44*b* in contact with the fixed stop 47** to provide a reproducible starting point for wheel motion.

Ordinarily it is desired to locate a carriage return code or a word space code at the operating station. The punchings of these codes are ordinarily chosen for easy identification. For example, in one known 8-channel code set, the carriage return code is the only code in the set having a bit in the eighth channel. Common 5-channel or Baudot code tape is characterized by the carriage return code being an edge punch. Word space codes are equally characteristic, usually involving only a single bit. It is preferred to provide indicating means to assist the operator in locating these common codes. For example, paper tape can be provided having a colored stripe in the channels indicative of the characteristic bits. In the drawings, a colored stripe 35 is shown in the eighth channel of an 8-channel coded tape, thus indicating the presence of carriage return codes by noting any hole in the colored stripe. Similarly, indicators such as 26 can be provided on structure adjacent to the tape, to point to the characteristic channels to assist in the location and identification of the specific code.

The apparatus thus described operates as follows. When it is desired to locate a specific code punching in tape 30 at the punching station 23, the code is first identified by the operator and positioned by rotation of wheel 41 in alignment with the clearly visible reference mark 24. Pushbutton 46 is then depressed by the index or middle finger causing pin 44*a* to move axially along the shaft 42 and in between two adjacent teeth 45. While the pushbutton 46 is held depressed, the drive wheel 41 is rotated counterclockwise with the thumb, thus driving the tape 30 in the direction of arrow 36 and towards the punching station. The pin 44*a*, which at the time of depression of pushbutton 46 was resting against fixed stop 47, is rotated with the drive wheel 41 through angular increment $\alpha$ until it engages the adjustable stop 48. The selected code punching is now positioned exactly at the punching station 23. When the operator releases pushbutton 46 the arm 44 is moved axially by spring 44*c* and is rotated back to fixed stop 47 by spring 44*d* preparing the machine for further use.

It will be appreciated by those skilled in the art that we have provided a particularly simple, but reliable and easy to operate record entry positioner that is useful in various contexts where a specific data entry is to be located in a position internal to a machine where visibility is impaired or nonexistent.

While a specific preferred embodiment of our invention has been disclosed herein for purposes of illustration, it will be understood that various changes, modifications, and additions can be made to the apparatus specified without departing from the scope and spirit of our invention as defined by the appended claims.

We claim:

1. An apparatus for delivering a record media along a predetermined path past an operational station in predetermined feed increments to operate at successive data entry locations thereon and having feed means operatively engageable with the record media and means for operating the feed means to move the record media along its path; the data entry locating mechanism comprising:
   - a clearly visible reference mark positioned along the path and spaced from the operational station by a distance that is a multiple of the feed increments,
   - a selectively activatable positioner engageable, when active, with the feed operating means for movement therewith, and
   - travel limit means engageable with said positioner to limit motion thereof to an amount proportional to said spacing distance.

2. Apparatus as defined in claim 1 further comprising resilient means operatively connected to said positioner for normally yieldably holding said positioner at one limit of its travel.

3. Apparatus for delivering a record media having feed holes therein along a predetermined path past an operational station in predetermined feed increments proportional to the spacing between the feed holes to operate at successive data entry locations therein, said apparatus having a pinwheel engageable with said feed holes, and rotatable means for driving the pinwheel to move the record media along its path, the data entry locating mechanism comprising:
   - a clearly visible reference mark positioned along the path and spaced from the operational station by a distance that is multiple of the feed increments,

- a selectively activatable rotatable positioner engageable when activated with the pinwheel drive means for movement therewith, and
   - travel limit means engageable with said positioner to limit rotational movement thereof to an amount proportional to said spacing distance.

4. Apparatus for delivering record media along a predetermined path past an operational station in predetermined feed increments to operate at successive data entry locations thereon and having feed means operatively engageable with the record media and a manually operable drive wheel for operating the feed means to move the record media along its path, the data entry positioning mechanism comprising:
   - a clearly visible reference mark positioned along the path and spaced from the operational station by a distance that is a multiple of the feed increments,
   - a selectively activatable positioner engageable when active with the manual drive wheel for movement therewith,
   - a pushbutton for controlling the selective activation of said positioner, and
   - travel limit means engageable by said positioner to limit motion thereof to an amount proportional to said spacing distance.

5. Apparatus as defined in claim 1 wherein said operational station is the punching station of a code punch.

6. Apparatus for delivering a record tape having feed holes therein along a predetermined path past an operational station in predetermined feed increments proportional to the spacing between feed holes to operate at successive data entry locations therein, and having a pinwheel operatively engageable with the record media feed holes, and a manual drive wheel for operating the pinwheel to move the tape along its path, the data entry positioning mechanism comprising:
   - a clearly visible reference mark positioned along the path and spaced from the operational station by a distance that is a multiple of the feed increments,
   - a positioning crank arm rotatably supported coaxially with the drive wheel and axially slidably relative thereto, said crank arm having an axially extending pin thereon,
   - teeth formed in the drive wheel at angular increments thereabout proportional to the spacing between tape feed holes,
   - a pushbutton engageable with said crank arm for selectively moving said crank arm axially relative to said drive wheel for engaging said pin with said teeth,
   - a first stop positioned adjacent said pin,
   - means resiliently normally holding said pin against said first stop, and
   - a second stop positioned in the rotational path of said pin and spaced angularly a distance from said first stop, proportional to said spacing distance.

References Cited

UNITED STATES PATENTS

| | | | |
|---|---|---|---|
| 2,451,365 | 10/1948 | Spencer et al. | 178—42 X |
| 2,749,986 | 6/1956 | Maul | 234—129 X |
| 2,969,174 | 1/1961 | Bogart | 234—129 X |

WILLIAM S. LAWSON, *Primary Examiner.*

U.S. Cl. X.R.

83—252; 178—42; 226—130, 143